UNITED STATES PATENT OFFICE.

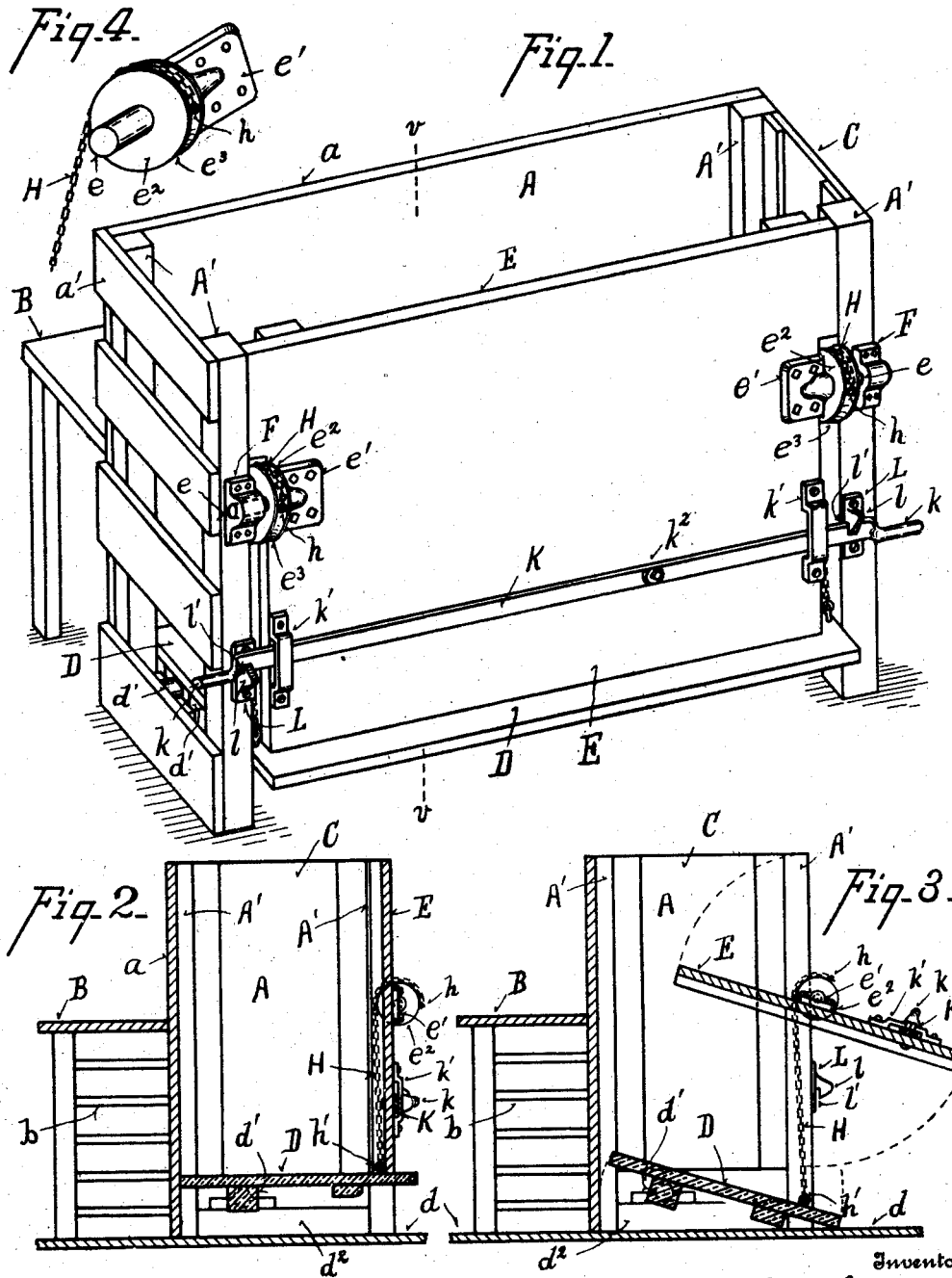

HERMAN C. AHRENS, OF CINCINNATI, OHIO.

KNOCKING-PEN.

No. 907,215.      Specification of Letters Patent.      Patented Dec. 22, 1908.

Application filed January 25, 1908. Serial No. 412,684.

*To all whom it may concern:*

Be it known that I, HERMAN C. AHRENS, a citizen of the United States, residing at Cincinnati, in the county of Hamilton and State of Ohio, have invented certain new and useful Improvements in Knocking-Pens, of which the following is a specification.

My invention relates to improvements in knocking pens.

One of its objects is to provide a knocking-pen in which the movable discharging members normally counterbalance each other so as to be readily and easily moved to either the open or closed position, while the weight of the steer disturbs the equilibrium and tends to throw the discharge members to the open position.

Another object is to provide a discharge opening of sufficient size, to insure the passage of the steer.

Another object is to provide simple and reliable counterpoise and discharge mechanism.

Another object is to provide improved and simple latch mechanism.

It further consists in certain details of form, combination and arrangement, all of which will be more fully set forth in the description of the accompanying drawings, in which—

Figure 1 is a perspective view of a knocking-pen embodying my improvements, showing the parts in the closed position. Fig. 2 is a section on line $v$—$v$ of Fig. 1 showing the parts in the closed position. Fig. 3 is a section on line $v$—$v$ of Fig. 1, showing the parts in the open position. Fig. 4 is a perspective view of one of the pivoting members.

In the accompanying drawings, A, represents a pen of about the height of a steer, and of sufficient length and width to receive the steer in the standing position. The pen is preferably composed of a wooden frame work, either with closed or slatted side walls.

A' represents permanent uprights to which the side, $a$, and end, $a'$, are preferably rigidly secured. A platform, B, reached by stairs or steps, $b$, serves to support the operator in position to strike the steer.

C represents a door or gate through which the steer is admitted into the pen, and locked therein.

D represents the floor of the pen which is preferably elevated above the floor, $d$, of the building. The floor, D, is preferably a tight or closed floor, and is pivotally supported upon a bar, $d'$, beneath floor, D, and at one side of its center and running lengthwise of the pen, the ends of bar, $d'$, being journaled to cross-timbers, $d^2$, at the ends of the floor, D. The side wall, or gate, E, is pivoted or journaled by means of studs, $e$, journaling in brackets, F, carried by the uprights, A'. The studs, $e$, are carried by plates, $e'$, which are attached at opposite sides to the side wall E, collars, $e^2$, having grooved peripheries, $e^3$, are located at the base of the studs, $e$, and preferably formed integral both with the studs, $e$, and plate, $e'$. Chains or wire cables, H, are attached at one end to the collars, $e^2$, at $h$. The chains, H, rest in the grooves, $e^3$, over the top of collars, $e^2$, and are attached at their opposite ends to eye-bolts, $h'$, secured to the corners of the floor, D, beneath the collars, $e^2$. The ends of the side wall, E, are recessed to receive the collars, $e^2$, and below that point for the passage of chains, H. The pivotal supports for the gate E are preferably located at a point near and slightly above its center, and when in the open or partly open position, that portion of the gate E above the pivotal supports serves to counterbalance the part of gate E below said pivotal supports.

It will be noted that when the side wall or gate, E, is brought to the vertical or closed position, the chains winding over the collars, $e^2$, serve to lift the floor, D, into a horizontal position. The pivotal support for the floor, D, and the studs, $e$, and brackets, F, are so positioned that the floor, D, and gate, H, counterbalance each other in a position, midway between the positions shown in Fig. 2 and Fig. 3, and are nearly counterbalanced in the closed position Fig. 2, and in position Fig. 3, and so as to close and latch without excessive jarring after discharging the steer.

In order to lock the gate, H, and floor, D, in the closed position, I provide a latch-bar, K, of the length of the pen and preferably provided at each end with a handle, $k$, so that the gate, H, may be released from either end. The bar, K, is confined at opposite sides of gate, H, by straps, $k'$, to limit the movement of bar, K and hold it against the face of gate, H. Bar, K, is pivoted at $k^2$, to gate, H, at one side of its center, so that bar, K, being heavier on one side of the pivot than the other, will normally assume an inclined position.

L represents catches having tapered noses, $l$, and recesses, $l'$, to catch and hold the bar, K, the catches, L, being set one facing upward and the other downward, so that when gate H is closed, the opposite ends of bar, K, will ride over the inclines, l, and enter the recesses, l', thus locking the floor, D, and gate, H, in the closed position.

In operation, the floor, D, is brought to a horizontal position and gate, H, closed and latched. A steer is then driven into the pen through gate, C which is also latched. An operator standing on platform, B, strikes the steer on the head and kills it. The steer drops in a heap on the floor of the pen. An operator then trips the latch-bar, K, whereupon due to the added weight of the steer upon the floor, and often against the lower portion of gate, H, the floor quickly assumes the inclined position and gate, H, opens, which causes the steer to roll through the opening between the edges of the floor and gate, H, and to make one or two complete revolutions, which brings the steer to the desired position for the succeeding operations. The gate, H, may then be closed and latched, which also returns floor, D, to a horizontal position, and the pen is ready to receive another steer.

The mechanism herein illustrated and described is capable of considerable modification without departing from the principle of my invention.

Having described my invention, what I claim is:

1. In a mechanism of the character indicated, a floor member pivotally supported at one side of its center of gravity, a wall member pivotally supported at a point, near and slightly above its vertical center, and means connecting said floor and pivoted side walls so as to substantially counterbalance said parts in their various positions, and to lift said floor from an inclined to a substantially horizontal position, when said wall member is moved to a vertical position.

2. In a mechanism of the character indicated, a floor member pivotally supported at one side of its center of gravity, a wall member pivotally supported at a point, near and slightly above its center of gravity, circular collars carried by said wall member and flexible connections connected to said floor and partially encircling said collars, to lift said floor from an inclined to a substantially horizontal position when said side wall is moved to the closed or vertical position.

3. In a mechanism of the character indicated, a floor member pivotally supported at one side of its center, a wall member pivotally supported above and near its center of gravity, a flexible member connected at one end to the depending side of said floor member and at the opposite side partially encircling the axis of rotation of said wall member to cause said members to counterbalance and to move in unison and latch mechanism to lock said wall member in its closed position.

4. In a mechanism of the character indicated, a pivotally supported and tiltable floor member, a pivotally supported and tiltable wall member, a latch to lock said wall member in its closed position, and a flexible connection attached at one end to the dependent portion of said floor member, and at the opposite end partially encircling the journal of said wall member to counterbalance and to cause said floor and wall members to move in unison.

In testimony whereof I have affixed my signature in presence of two witnesses.

HERMAN C. AHRENS.

Witnesses:
C. W. MILES,
AGNES McCORMACK.